(No Model.)
D. HALE.
VALVE FOR AIR CUSHIONS.
No. 476,957.   Patented June 14, 1892.
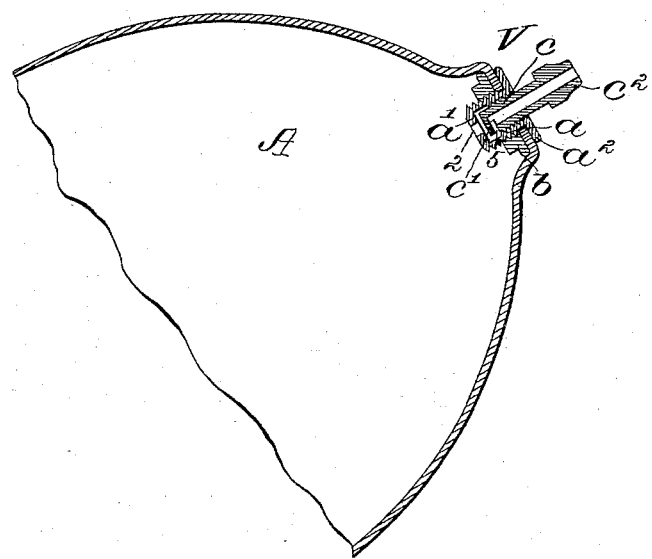
Witnesses.
Louis N. Gowell
Edward F. Allen
Inventor:
David Hale
By Crosby & Gregory Attys.

UNITED STATES PATENT OFFICE.

DAVID HALE, OF BOSTON, MASSACHUSETTS.

VALVE FOR AIR-CUSHIONS.

SPECIFICATION forming part of Letters Patent No. 476,957, dated June 14, 1892.

Application filed August 10, 1891. Serial No. 402,216. (No model.)

*To all whom it may concern:*

Be it known that I, DAVID HALE, of Boston, county of Suffolk, State of Massachusetts, have invented an Improvement in Valves for Air-Cushions, of which the following description, in connection with the accompanying drawing, is a specification, like letters and figures on the drawing representing like parts.

This invention has for its object to provide an improved valve for air-cushions and the like, which shall furnish convenient means for inflating the cushion and for closing the valve to retain the air. Valves for this purpose as heretofore constructed have been exceedingly cumbersome and ill adapted for many purposes because practically the entire valve has been placed outside of the article to which it is attached.

This invention comprehends a concealed valve or one arranged entirely below the surface of the article to which it is attached, a sufficient portion only protruding to enable the article to be properly inflated and the valve to be thereafter closed.

One part of this invention therefore consists in the combination, with an article adapted to be inflated with air or gas, of an interiorly-threaded valve-case flanged at its outer end and exteriorly threaded to receive thereon a retaining-nut, the material of the article being clamped between said flange and nut, a valve-seat in the bottom of said casing, a tubular rotatable stem externally threaded to fit in said casing and having a closed end to co-operate with the valve-seat, and an opening in the stem above its closed end, said end and opening constituting the valve, the outer end of said stem protruding beyond the surface of the article, whereby the article may be inflated, rotation of the stem opening or closing the valve and retaining it in fixed position, substantially as will be described.

The drawing represents in section an article fitted with a valve embodying this invention.

A represents a portion of any article designed to be inflated with air, it being fitted at some convenient point with a valve V, herein represented as consisting of a tubular valve-case $a$, formed at its lower end to present a seat $a'$, in which is an opening 2, the case $a$ being threaded exteriorly to receive the nut $b$, the material of the article A being clamped between the nut and the flange $a^2$ on the collar to form an air-tight joint. A tubular valve $c$, having a partially-closed end portion $c'$, is threaded within the tubular valve-case $a$, said valve having an opening 5 at one side near its closed end, as shown.

With the parts in the position shown, if air be forced into the article through the valve $c$ and openings 5 and 2, the article A will become inflated, when the valve may be rotated to cause the closed end portion $c'$ to be seated firmly against the valve-seat $a'$ to close the opening 2 and confine the air within the article.

The principal difficulty heretofore apparent in employing a blind or concealed valve has been the difficulty of opening and closing the valve, and as a consequence the valves have very generally been arranged upon the outside of the article to which they have been attached. In accordance with this invention, however, the valve $c$ is provided with a tubular shank or stem $c^2$, which projects beyond the surface of the article A only far enough to be placed between the lips, if necessary, for the inflation of the article and to thereafter be grasped between the fingers and rotated to close the valve or open it.

Whereas, heretofore the placing of the valve proper and its seat entirely outside of the article has produced a large and clumsy device, a valve constructed in accordance with my invention, having the valve, its seat, and all other necessarily bulky portions concealed beneath the surface of or within the article to which the valve is attached, the slight shank $c^2$ alone protruding, provides a very desirable and simple device.

I claim—

The combination, with an article designed to be inflated with air, of an interiorly-threaded valve-case flanged at its outer end and exteriorly threaded to receive thereon a retaining-nut, the material of the article being clamped between said flange and nut, a valve-seat in the bottom of said casing, a tubular rotatable stem externally threaded to fit in said casing and having a closed end to co-operate with the valve-seat, and an opening in the stem above its closed end, said end and opening constituting the valve, the outer end of said stem protruding beyond the surface of the article, whereby the article may be inflated, rotation of the stem opening or closing the valve and retaining it in a fixed position, substantially as described.

In testimony whereof I have signed my name to this specification in the presence of two subscribing witnesses.

DAVID HALE.

Witnesses:
FREDERICK L. EMERY,
FRANCES M. NOBLE.